(12) United States Patent
Gutierrez

(10) Patent No.: US 12,731,840 B2
(45) Date of Patent: Sep. 8, 2026

(54) METHOD OF PRODUCING AN ENCAPSULATED BATTERY CELL

(71) Applicant: Volocopter GmbH, Bruchsal (DE)

(72) Inventor: Pablo Gutierrez, Heidelberg (DE)

(73) Assignee: VOLOCOPTER TECHNOLOGIES GmbH, Bruchsal (DE)

( * ) Notice: Subject to any disclaimer, the term of this patent is extended or adjusted under 35 U.S.C. 154(b) by 494 days.

(21) Appl. No.: 18/477,691

(22) Filed: Sep. 29, 2023

(65) Prior Publication Data

US 2024/0113373 A1 Apr. 4, 2024

(30) Foreign Application Priority Data

Sep. 29, 2022 (EP) .................................... 22198753

(51) Int. Cl.

| | |
|---|---|
| ***H01M 50/202*** | (2021.01) |
| ***B29C 70/22*** | (2006.01) |
| ***B29C 70/88*** | (2006.01) |
| ***H01M 10/653*** | (2014.01) |
| ***H01M 10/658*** | (2014.01) |
| ***H01M 50/213*** | (2021.01) |
| ***H01M 50/222*** | (2021.01) |
| ***H01M 50/227*** | (2021.01) |
| ***H01M 50/229*** | (2021.01) |
| ***H01M 50/236*** | (2021.01) |

(Continued)

(52) U.S. Cl.

CPC ......... *H01M 50/202* (2021.01); *B29C 70/222* (2013.01); *B29C 70/88* (2013.01); *H01M 10/653* (2015.04); *H01M 10/658* (2015.04); *H01M 50/213* (2021.01); *H01M 50/222* (2021.01); *H01M 50/227* (2021.01); *H01M 50/229* (2021.01); *H01M 50/236* (2021.01); *H01M 50/24* (2021.01); *H01M 50/244* (2021.01); *H01M 50/249* (2021.01); *H01M 50/289* (2021.01); *H01M 50/383* (2021.01); *B29K 2023/00* (2013.01); *B29K 2063/00* (2013.01); *B29K 2105/0014* (2013.01); *B29K 2105/0827* (2013.01); *B29K 2309/02* (2013.01); *B29K 2995/0013* (2013.01); *B29K 2995/0077* (2013.01); *B29L 2031/7146* (2013.01)

(58) Field of Classification Search

CPC ............. H01M 10/653; H01M 10/658; H01M 10/0481; H01M 50/202; H01M 50/222; H01M 50/227; H01M 50/229; H01M 50/236; H01M 50/293; H01M 50/24; H01M 50/242; H01M 50/249; H01M 50/383

See application file for complete search history.

(56) References Cited

U.S. PATENT DOCUMENTS

| | | | |
|---|---|---|---|
| 6,127,064 | A | 10/2000 | Shibata et al. |
| 2010/0075221 | A1 | 3/2010 | Mehta et al. |

(Continued)

FOREIGN PATENT DOCUMENTS

| | | |
|---|---|---|
| CN | 105315475 | 2/2016 |
| EP | 3846244 | 7/2021 |

(Continued)

*Primary Examiner* — Lessanework Seifu

(74) *Attorney, Agent, or Firm* — FIG. 1 Patents

(57) ABSTRACT

A method of producing an encapsulated battery cell (1), includes: a) braiding a battery cell (1') with a fibre roving (8*ba*) to create a braid around the battery cell (1'); b) impregnating the braid with a resin material (8*ad*); and c) curing the resin material (8*ad*).

18 Claims, 3 Drawing Sheets

(51) Int. Cl.

| | |
|---|---|
| ***H01M 50/24*** | (2021.01) |
| ***H01M 50/244*** | (2021.01) |
| ***H01M 50/249*** | (2021.01) |
| ***H01M 50/289*** | (2021.01) |
| ***H01M 50/383*** | (2021.01) |
| *B29K 23/00* | (2006.01) |
| *B29K 63/00* | (2006.01) |
| *B29K 105/00* | (2006.01) |
| *B29K 105/08* | (2006.01) |
| *B29K 309/02* | (2006.01) |
| *B29L 31/00* | (2006.01) |

(56) References Cited

U.S. PATENT DOCUMENTS

| | | | | |
|---|---|---|---|---|
| 2012/0308857 | A1 | 12/2012 | Hermann et al. | |
| 2014/0242435 | A1 | 8/2014 | Callahan | |
| 2021/0126278 | A1 | 4/2021 | Sugiyama et al. | |
| 2021/0320365 | A1* | 10/2021 | Nishikawa .......... | H01M 10/613 |

FOREIGN PATENT DOCUMENTS

| | | |
|---|---|---|
| WO | 2014197675 | 12/2014 |
| WO | 2017042308 | 3/2017 |

* cited by examiner

METHOD OF PRODUCING AN ENCAPSULATED BATTERY CELL

CROSS-REFERENCE TO RELATED APPLICATIONS

This application claims priority to European Patent Application No. 22198753.0, filed Sep. 29, 2022, which is incorporated herein by reference as if fully set forth.

TECHNICAL FIELD

The invention relates to a method of producing an encapsulated battery cell, especially for use in aircraft, such as eVTOL (electrically propelled vertical take-off and landing) aircraft.

The invention also relates to an encapsulated battery cell produced in accordance with said method.

BACKGROUND

Battery cells, such as lithium-ion battery cells, can go into thermal runaway (TR) due to external influences or internal faults, during which they may release large amounts of heat, gases and debris. In order to limit the potentially dangerous effects of such an event, some form of thermal runaway containment of the battery cells is required.

WO 2017/042308 A1 discloses ceramic plates which serve as a thermal barrier between battery cells but not as mechanical shield or container. This means that mechanical forces of ruptured cells may still compromise neighbouring cells. Additionally, the proposed design requires a high amount of material which makes it not suitable for aircraft applications, in contrast to the automotive industry.

US 2012/308857 A1 discloses the use a pre-formed "secondary can" around the actual battery can to inhibit an uncontrolled escape of hot, pressurized gas from a battery cell.

US 2010/075221 A1 proposes the use of an intumescent material consisting of micro particles of a high temperature resistant ceramic material contained in a resin or thermoplastic matrix which reacts with temperature and increases the thickness of the material, thereby increasing thermal resistance.

WO 2014197675 A2 primarily focuses on systems that have working temperatures below the boiling points of flammable liquids in Li-ion batteries (e.g., ethyl methyl carbonate). Other solutions are presented that try to prevent or retard fire generation and/or propagation of the inner materials of the cell.

US 2014/242435 A1 proposes the use of flat structures that provide thermal and electrical resistance with no special attention to mechanical stability.

U.S. Pat. No. 6,127,064 A proposes a solution which is limited to prevent swelling of prismatic cells.

In view of said prior art, there is a need for providing a low-weight and highly reliable battery cell encapsulation or container, preferably for lithium-ion batteries, that can be used for aerospace applications, which encapsulation prevents uncontrolled venting of gases in case of thermal events, in particular through the battery's lateral side wall(s). In addition, there is a need for providing a method which can produce such battery/container assemblies (i.e., encapsulated battery cells) in high numbers for serial production.

SUMMARY

This object is achieved by means of a method including one or more of the features disclosed herein. The object is also achieved by an encapsulated battery cell manufactured in accordance with said method.

The method according to the invention comprises the steps of: a) braiding a battery cell with a fibre roving to create a braid around the battery cell; b) impregnating the braid with a resin material; and c) curing the resin material.

Preferably, said braid can be characterized by one or more of the following features:

- A thread diameter preferably is a function of the energy being contained. The bigger the diameter of the cell, the bigger the hoop stress and hence the bigger the diameter of the thread. As reference, for a 21 mm cell diameter, assuming a strength of around 330 Mpa, a thread of 0.15 mm may be sufficient.
- A braiding angle preferably is as low as possible (high skewness) without inducing self-shearing and without compromising manufacturability. Most preferably, it shall be around 30°.
- A number of strands in the braid is preferably derived from the desired braiding angle, the diameter of the threads and the diameter of the cylinder to braid. Nevertheless, the thinner the thread and the higher the number of strands, the lower the chances that the threads have a relative motion during a thermal runaway (TR) event, which ensures correct functionality.
- A number of threads per yarn is preferably only 1. The idea is to keep the container as light as possible and if the thread diameter is 0.15 mm with 330 Mpa strength, one thread should be enough. For ceramic fibres, making threads below 0.38 mm is rather challenging, therefore a preferred goal is to keep the mass of the container as low as possible while keeping the thread strength at high temperatures as high as possible.

Thus, to overcome the disadvantages of the prior art, applicant proposes a method of producing a container or encapsulation around known battery cells, e.g., lithium-ion-batteries, to reduce the risk of lateral venting of hot gases in case of thermal events. The proposed method, due to its simple concept, has the potential to be applied in serial mass-production of such batteries, especially for those used in aerospace applications, preferably in eVTOL aircraft.

Although the inventive method defined above comprises creating the braid first and then impregnating it with a resin material, an alternative approach comprises using prepregs, i.e., fibre material that is pre-impregnated with resin. However, prepregs normally are too sticky and might make the conforming process of the threads onto the battery cells more difficult. This is at least partly due to the fact that the threads have to slide onto each other and onto the cell while they are conformed. If they stick to each other, they may break in the process, thus weakening the resulting structure.

Aerospace grade embodiments of the present invention for thermal runaway containment preferably provide a low-weight solution with higher reliability than the prior art. Therefore, the following aspects may be individually or—preferably—jointly present in embodiments of the proposed solution:

- Low density: To comply with the mass budget available for thermal runaway containment, the latter (i.e., the encapsulation) preferably weighs less than 6% of a battery cell mass.
- Electrical Conductivity: Preferably, the proposed battery cell encapsulation also provides an electrical insulation.
- Thermal Resistance: Preferably, the proposed battery cell encapsulation has a very low thermal conductivity, ideally below 0.25 W/m*K at 800° C.

Stress retention: Preferably, the proposed battery cell encapsulation has a Young's modulus and an ultimate tensile strength equal to or better than that of a battery cell's can (which can is typically made from, e.g., nickel plated A3 stainless steel). However, it should additionally have a stress (or strength) retention above 50% at 800° C. Stress (or strength) retention is measured in %. It indicates the percentage of initial strength at room temperature that is still present at a given (elevated) temperature.

Thermal expansion: Preferably, the proposed battery cell encapsulation has a thermal expansion that is below the thermal expansion of the battery cell case (or cell can), ideally below 8 μm/(m*K).

Tolerancing (fitting): The method for producing said battery cell encapsulation preferably ensures that at thermal runaway temperature of the cell can, there is no tolerancing problem since the fibres are braided directly onto the cell can. In contrast to this, in the prior art so-called can sleeves were made separately, and then the cells are fit into said sleeves. Since the sleeves and cells typically vary in diameter due to tolerancing, some intricate scheme had to be devised for dealing with said tolerances. Typically, such tolerances could be up to 0.3 mm when the sleeve is bigger by +0.15 mm and the cell is smaller by −0.15 mm. This creates a gap in which a sidewall rupture can be initiated. In principle, this can be controlled by a difference in thermal expansion, such as when the cell expands at, e.g., by 0.6 mm in diameter at 800° C. (assuming free expansion), if the sleeve expands only by 0.1 mm in diameter, there should be—in theory—an interference of 0.2 mm (0.3 mm+0.1 mm−0.6 mm) which shall fill the previously existing 0.3 mm gap.

Low cost: Preferably, the cost of the encapsulation is only a fraction of the cost of the cell itself.

Mass production: Preferably, an embodiment of the proposed method allows continued production that provides the required delivery rates while complying with the different aspects mentioned above.

A solution of the thermal runaway containment problem is assumed to be most effective if it complies with all the aspects mentioned above.

Preferably, embodiments of the present invention define a continued, effective, light-weight and low-cost manufacturing method to provide structural capabilities to, e.g., cylindrical battery cells so as to prevent side rupture or propagated crack from the top or bottom, while ensuring purely axial rupture and/or venting.

The solution presented herein requires the use of fibres (i.e., fibre rovings, which are long and narrow bundles of individual fibres) that advantageously comply with all of the requirements stated above. These fibres are used to cover the battery cell, e.g., a cylindrical cell in the form of a braid, which generally refers to an interweaving of flexible strands of hair, wire, fibre, etc.

If the battery cell (hereinafter also simply referred to as "cell") has a cylindrical shape, it is preferred that the container or encapsulation enclose the whole outer shell of the (battery) cell at a radius R, which radius R is equal to a radius of the cell can itself. More preferably, in a region around the axial ends of the can the container or encapsulation has a radius r, wherein r<R. This helps to retain the stresses in case of thermal events, which are highest around those axial ends of the can.

Also, the container can advantageously extend beyond the actual battery cell for at least 3 mm, preferably 5 mm, towards said axial ends. This helps to direct hot venting gases in case of thermal events in an axial direction and therefore away from any neighbouring cells where, otherwise, they could induce another thermal event which could lead to a thermal runaway of a number of neighbouring battery cells. Typically, (cylindrical) battery cells are arranged with parallel longitudinal axes.

Although a number of materials can be used for the container or encapsulation, applicant has found that ceramic fibre materials are well suited and can be advantageously used for aerospace applications. Ceramic fibre materials are electrically insulating, which is especially advantageous because it may prevent short circuits between cells via their respective cans, or via cell interconnectors that may accidentally touch the can during, e.g., a crash event. Additionally, ceramic fibres have demonstrated to have low or even negative thermal expansion which can prevent the cell can from generating a bulge or notches on the surface due to internal pressure which may ultimately result in cracks and therefore cell failure (sidewall rupture). Moreover, some ceramic fibres are available at very low density (and thus weight) which makes the solution applicable to aerospace industry.

Most importantly, ceramic fibre materials have a high stress retention. In the context of the present invention, tests showed that ceramic fibre materials with a stress retention above 50% at 800° C., preferably above 60% at 800° C., prevent radial venting through the can's side walls in a secure and reliable way.

Ceramic fibre materials also have a very low thermal conductivity, even at high operation temperatures. In the context of the present invention, tests have shown that ceramic fibre materials having a thermal resistance of 0.25

$$\frac{W}{m*K}$$

at 800° C. or less showed the best results in terms of thermal containment.

On the other hand, the resin used for impregnation of the braiding is preferably chosen to be flame retardant, as otherwise the resin could spontaneously catch fire (due to a flashing point or spontaneous combustion) during a thermal runaway event which can induce propagation of such an event.

A preferred embodiment of manufacturing method proposed herein is serialized braidtrusion directly on to the battery cell can, which is the casing that enclose the battery's chemistry. This process is preferably optimized by aligning a plurality of (cylindrical) cells axially in the form of a string or strand and by separating pairs of them by so-called "jig cell spacers", i.e., spacing material in the form of spacing elements. These spacers are preferably formed to enable the braiding fibres to conform onto the edge of the cell can. Additionally, they may be devised for providing a free space for interconnectors (e.g., wire bonds or the like) to contact the negative pole of the battery at the edge (on the positive side of the cell). In practice, one just needs to expose a fraction of the cell can edge to be able to connect the negative polarity of the cell. Furthermore, said spacers can avoid the cells to be connected electrically during the braiding process. The spacers may further create sufficient space to cut the battery string to length in order to divide the braided (or encapsulated) cells after the resin curing process.

More preferably, the cells can be aligned at a constant distance to each other and separated by respective identical spacers. The braid fibres are preferably impregnated by the resin by submerging them—together with the batteries—in a resin bath. The resin can then be cured using UV (Ultra Violet) radiation or low temperatures (preferably at less than 60° C. to 80° C.), for instance by using either an ultraviolet chamber or a low temperature heated die, respectively. Since thermal runaway (i.e., battery cell explosion) can be triggered at around 120° C., failing to use the correct resin (UV cured or low temperature exothermic resin) may be detrimental to the proposed method as it will trigger the cells in thermal runaway. Additionally, the operational and storage maximum temperature of battery cells are often between 60-80° C. which, when exceeded, could compromise the integrity certified by the manufacturer.

Preferably, the fibres are braided (by means of a suitable braiding machine) to conform the jacket (or braid) of the ceramic material (or any equivalent low thermal expansion and high temperature resistant material) directly onto the cell can. Simultaneously, the cells can be fed by a so-called cell pushing pulley through a guide tube that is located at the centre of the braiding machine. This tube can advantageously have a "needle-like" (i.e., a diagonally cut) open at the end where the fibres are starting to be braided on to the cells (which cells slip on the remaining small surface of the tube's end, thus being supported). This feature allows starting to braid the cells while preventing the cells to fall (as the "needle shape tube", through which they are guided, is still holding them).

In the case of using a low temperature exothermic reactive resin, a second bath can advantageously be used to apply the required catalyst to harden the composite.

A puller (or pulleys) can be used for pulling a line of already cured braided cells, and said puller or pulleys is/are preferably synchronized with additional pushing pulleys (that can be used for pushing the cells prior to braiding).

A cut-off saw can be used to cut the braided cells preferably at a location as close to the negative pole of a given cell as possible in order to allow the cells to be glued to a cooling plate, if needed.

Typically, the complete cell can function as the negative pole of the cell. In the above-described embodiment, the bottom of the cell can advantageously be glued to a cooling plate since the top edge of the cell is exposed (owing to said close cutting), as this top edge also is part of the negative pole and can be electrically contacted to connect the battery cell to an electrical circuit.

In view of the above, the following embodiments of the method according to the invention have proved particularly advantageous:

In an embodiment of the method according to the invention, a ceramic material is used for the fibre roving. Corresponding advantages have already been presented further up.

Suitable ceramic materials include, e.g., $Al_2O_3$; 89% $Al_2O_3$ 10% $ZrO_2$ 1% $Y_2O_3$; 85% $Al_2O_3$ 15% $SiO_2$; 60% $Al_2O_3$ 40% $SiO_2$; 80% $Al_2O_3$ 20% $SiO_2$; and 70% $Al_2O_3$ 28% $SiO_2$ 2% $B_2O_3$. The invention is not limited to these materials.

In another embodiment of the method according to the invention, a material having a strength (or stress) retention of at least 50% at 800 degrees Celsius, preferably at least 60% at 800 degrees Celsius, is used for the fibre roving. This ensures that the material keeps its required structural properties even if a thermal runaway event occurs.

In yet another embodiment of the method according to the invention, a material having a thermal conductivity of at most 0.25 W/(m·K) at 800 degrees Celsius is used for the fibre roving. This ensures that thermal runaway events do not easily spread to neighbouring battery cells.

In still another embodiment of the method according to the invention, a material with a low or negative expansion coefficient is chosen for the fibre roving, preferably a material with an expansion coefficient below 8 μm/(m*K). This can help to apply radially inwardly directed pressure on a cell that experiences thermal runaway, thus preventing lateral burst and directing venting products in an axial direction. Although this may work best for cylindrical cells, the invention is not limited in this respect.

In a highly preferred embodiment of the method according to the invention, a fire-retardant material is used as the resin material. The advantage of using such a material has already been commented on above.

Examples of such materials include, without limitation, phenol/urea-formaldehyde flame retardant resins, flame retardant epoxy, polyolefin flame retardants and phosphate-based flame retardants.

In another highly preferred embodiment of the method according to the invention, the braid is tightly applied to an outer casing of the battery cell. In this way, any (radial) bulging or (lateral) rupturing of the cells can be safely prevented.

In yet another highly preferred embodiment of the method according to the invention, the braiding is carried out such that the braid protrudes at at least one end relative to the battery cell. As already explained above, this provides a location to separate adjacent cells after curing of the resin. Furthermore, said protrusion can be used as a venting channel for (axially) guiding venting products.

In still another highly preferred embodiment of the method according to the invention, the braid is formed at said one end with a reduced dimension (e.g., diameter) compared to the rest of the braid and/or with an opening toward the exterior. This can provide increased stability.

Advantageously, in another preferred embodiment of the method according to the invention, the resin material is cured by UV radiation or at a temperature of at most 80 degrees Celsius, preferably at most 60 degrees Celsius. This prevents any negative thermal effects on the battery cell(s).

Advantageously, in yet another preferred embodiment of the method according to the invention, the resin material is selected as a low temperature exothermic reactive material and is cured by means of a catalyst material. This, too, prevents any negative thermal effects on the battery cell(s).

Advantageously, in still another preferred embodiment of the method according to the invention, a plurality of battery cells, preferably rod-shaped or cylindrical battery cells, are arranged continuously one behind the other, in particular longitudinally one behind the other, and are continuously fed in the form of a battery cell string to a braiding device, in which braiding device the battery cells are continuously provided with said braid in the form of a continuous braid, wherein preferably a spacer material or spacer element is placed between any two adjacent battery cells in the string prior to feeding said battery cell string to the braiding device. Such an embodiment is well suited for mass production of encapsulated battery cells.

By way of example, any elastomeric self-lubricant material can be used as spacer material, e.g., fluorosilicone, graphited silicone, etc.

As already explained above, according to another embodiment the battery cells are fed to the braiding device through a tubular feed, which feed is cut obliquely ("needle-like") with respect to its course, whereby the battery cell string can already be provided with the braiding on one side, while the battery cell string is still supported by said feed on the other side.

In order to cure the resin, in another embodiment, the battery cell string together with the braid is passed through a first bath with the resin material and then, in one embodiment, either through a second bath with the catalyst material or, in another embodiment, through a UV irradiation device or a temperature curing device.

As mentioned earlier, in yet another embodiment the battery cell string is cut to length between the individual battery cells by means of a cutting device (e.g., by means of a circular saw or the like), preferably, when using rod-shaped or cylindrical battery cells, immediately adjacent a respective negative terminal of a battery cell.

The spacer elements are removed prior to using the encapsulated battery cells.

BRIEF DESCRIPTION OF THE DRAWINGS

Further advantages and characteristics of the invention will now be described in exemplary fashion with reference to the attached drawings.

DETAILED DESCRIPTION

Figure 1:
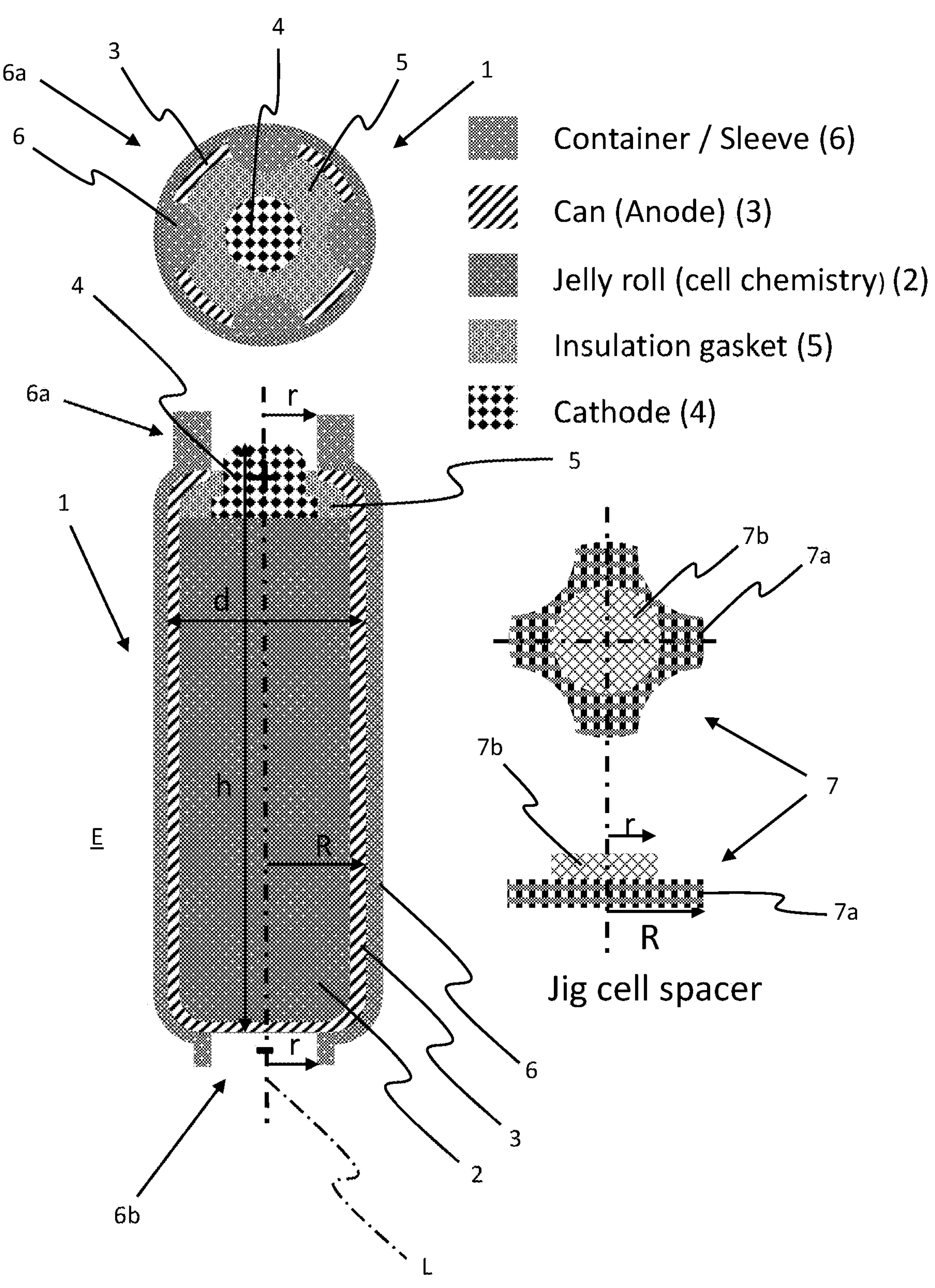
FIG. 1 shows an encapsulated battery cell manufactured according to the method of the invention and a corresponding spacer element in various views.

In FIG. 1, an encapsulated battery cell manufactured according to a method according to the invention is shown on the left-hand side. The encapsulated battery cell as a whole is designated by reference numeral 1. At the bottom left, the encapsulated battery cell 1 is shown in longitudinal section along longitudinal axis L. A top view of the encapsulated battery cell 1 in the region of the cathode (positive terminal) is shown at the top left.

As can be seen from the bottom left illustration in FIG. 1, the encapsulated battery cell 1 is designed in the form of a cylindrical rod cell with longitudinal axis or axis of symmetry L. Reference numeral 2 indicates the so-called cell chemistry, which is also colloquially referred to as a "jelly roll". The cell chemistry 2 is enclosed in a casing or cell can 3 made of metal, for example steel or aluminium, which also represents the anode of the encapsulated battery cell 1. The can 3 is open at one end (at reference numeral 1*a*) of the encapsulated battery cell 1. Here the cathode 4 is located, which protrudes slightly from the can 3 and is separated from the anode by an insulator ring or gasket 5. The actual battery cell from cathode 4 to the closed end of the can 3 has a dimension h in the direction of the longitudinal axis L. The can 3 has a maximum outer diameter d or a corresponding maximum outer radius R.

As can be seen from the illustration at the bottom left of FIG. 1, the entire battery cell, i.e., in particular the can 3, is surrounded on the outside by a braided sheathing made of ceramic fibres, which braided sheathing 6 is wound directly onto the can 3 from the outside and the impregnated with a resin, which resin is subsequently cured. Said braided sheathing 6 is also (alternatively) referred to as container or sleeve in FIG. 1. The braided sheathing 6 is tapered at the ends of the encapsulated battery cell 1; in these areas the braided sheathing 6 is located at a distance r from the longitudinal axis L, while in the other areas the respective distance equals R, $r<R$—with a possible exception in respective transitional areas.

The illustration at the top left in FIG. 1 shows—as already mentioned—a top view of the encapsulated battery cell 1 in the region of the cathode 4. It can be seen from the illustration that the braided sheathing 6 is arranged in restricted circumferential regions only at said distance r from the longitudinal axis L. In between there are areas in which the distance of the braided sheathing 6 from the longitudinal axis L is equal to R, such that in said latter areas the can 3, i.e., the anode is freely accessible to contact the encapsulated battery cell 1 electrically. The cathode 4 is accessible from the outside through a central aperture in the insulator ring 5.

In order to achieve the said geometry of the braided sheathing 6 when winding the ceramic fibres onto the can 3, a corresponding embodiment of the invention provides for arranging spacer elements 7 made of an electrically insulating material at the respective axial ends of the battery cells prior to braiding, as shown schematically in the right-hand part of FIG. 1. The spacer elements 7 have a first portion 7*a* in which they are complementary to the geometry of the braided sheathing 6 in the region of the cathode 4, as already described. In other words, when the spacer element 7 is arranged with its first section 7*a* in the region of the cathode 4 of the battery cell 1, winding or wrapping of the ceramic fibre results in a braided sheathing 6 with a geometry as specifically shown in the upper left of FIG. 1 (at reference numeral 6*a*).

The spacer elements 7 also have a second section 7*b*, in which they have a simple circular cross section with radius r. Overall, the spacer elements in the first section 7*a* are approximately cross-shaped, while they have a circular shape in the second section 7*b*.

When the ceramic fibre is wrapped around said second section 7*b* of spacer element 7, the result is a design of the braided sheathing 6 as shown in the lower area of the encapsulated battery cell 1 according to FIG. 1 at the bottom left: the braided sheathing 6 here simply has a tapered section with a clear inner radius r (at reference numeral 6*b*). This follows from the fact that, in a corresponding embodiment of the invention, a plurality of "naked" battery cells (i.e., without encapsulation) are arranged one behind the other in the axial direction with a respective spacer element 7 interposed in each case, and are then continuously encapsulated with the ceramic fibre and resin. In each case, a given spacer element 7 then helps to form in the region of the cathode 4 of a first battery cell 1 the geometry 6*a* shown at the top left in FIG. 1 for the braided sheathing 6, while the same spacer element 7 helps to form in the region of a directly adjacent second battery cell 1 the geometry for the braided sheathing 6 as shown at reference numeral 6*b*.

The individual battery cells 1 are then separated again by cutting the braided sheathing 6 in the area of the end faces of the battery cells 1—preferably by cutting in the area between the geometries 6*a* and 6*b*, such that the braided sheathing 6 has respective corresponding openings to the exterior E. The spacer elements 7 are then also removed (and destroyed), resulting in a design as shown in particular at the bottom left of FIG. 1.

Figure 2:
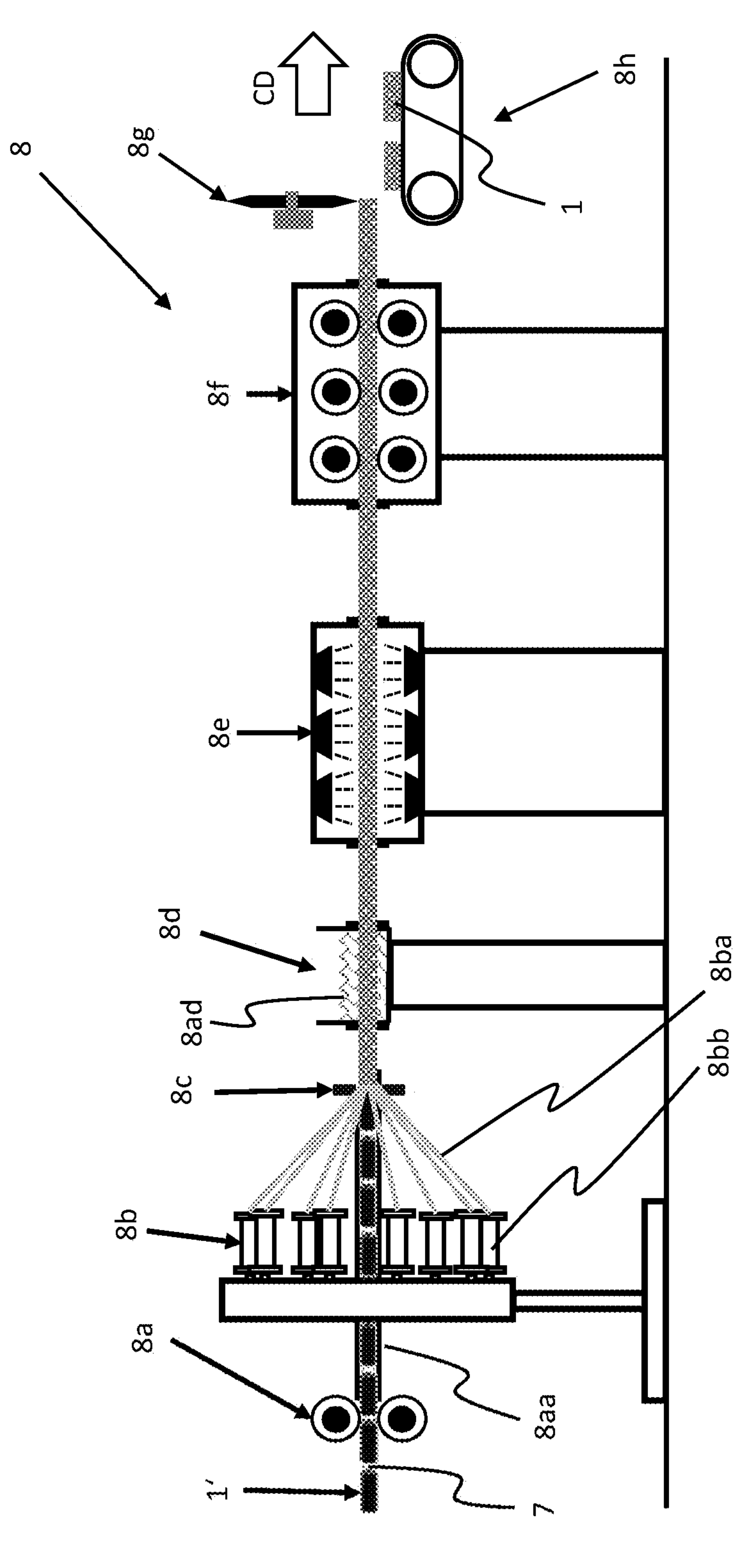
FIG. 2 shows a schematic representation of a device for carrying out the method according to the invention.

FIG. 2 schematically shows a device 8 which is designed and provided for carrying out a method according to the invention, in particular for mass production. The device 8 comprises, from left to right in a conveying direction CD, a roller feed device 8*a* designed for pushing "naked" battery cells 1' arranged axially one behind the other in the form of a string, a braiding device 8*b* for wrapping the battery cells 1' with a ceramic fibre 8*ba*, a guide device 8*c* for guiding the ceramic fibre or corresponding fibre rovings 8*ba* when wrapping the battery cell strings, a (first) bath 8*d* with a resin material 8*ad* for impregnating the ceramic fibre 8*ba* of the wrapped battery cell strings, a curing device 8*e* for curing the resin material 8*ad*, a roller conveyor device 8*f* designed for drawing the line of encapsulated battery cells, a cutting device 8*g* (e.g., a circular saw) for cutting to length or separating the encapsulated battery cells, and a further conveying device 8*h* for transporting the separated encapsulated battery cells 1 away.

The ceramic fibre 8*ba* and the (cured) resin material 8*ad* together form the braided sheathing 6, which has already been described in detail above with reference to FIG. 1.

The braiding device 8*b* comprises a plurality of spools 8*bb* for feeding a respective fibre roving of said ceramic material (i.e., ceramic fibre 8*ba*). The braiding device 8*b* is used for braiding a battery cell (or a plurality of such cells) 1' with said fibre roving 8*ba* in order to create a braid around the battery cell(s) 1'.

The (first) bath 8*d* with said resin material 8*ad* is used for impregnating the braid with the resin material 8*ad*.

The curing device 8*e* is used for curing the resin material 8*ad*. The curing device 8*e* may be a UV curing device or a low temperature curing device, depending on the type of resin material used. If a low temperature exothermic reactive resin material is used, in addition to the (first) bath 8*d*, there may be a (second) bath with a catalyst material located downstream in the direction CD with respect to the (first) bath 8*d*, which is not shown in FIG. 2.

As further shown in FIG. 2, the roller feed device 8*a* may comprise or co-operate with a tubular feed 8*aa*. This is shown again in more detail in FIG. 3.

Figure 3:
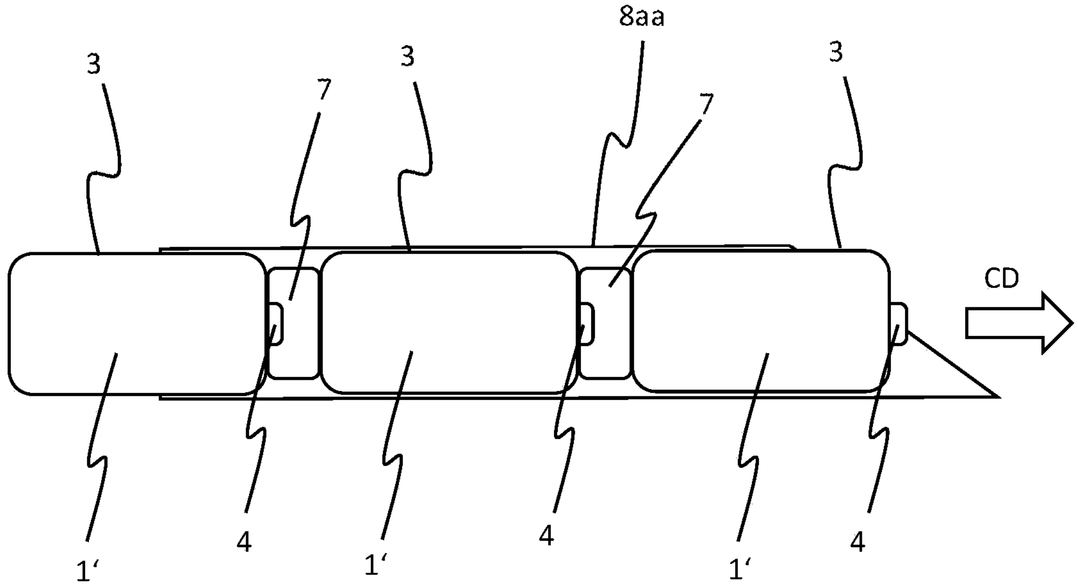
FIG. 3 shows a detail of the device of FIG. 2.

FIG. 3 shows several "naked" battery cells 1' arranged one behind the other in a string. A respective spacer element 7 is located between every two battery cells 1', as described in detail, for example, above on the basis of FIG. 1. Reference numeral 8*aa* indicates the tubular feed already mentioned.

This tubular feed 8*aa* is cut off at an oblique angle at its rear end in the conveying direction CD, similar to a medical needle. In this way, the battery cells 1' emerging from the tubular feed 8*aa* can already be braided from above by means of the braiding device not shown in FIG. 3 (cf. FIG. 2), while the battery cells 1' are still supported against gravity and guided by the extended design of the tubular feed 8*aa* in the lower area.

The invention claimed is:

1. A method of producing an encapsulated battery cell, comprising:

a. braiding a battery cell with a fibre roving to create a braid around the battery cell;

b. impregnating the braid with a resin material; and c. curing the resin material.

2. The method according to claim 1, wherein a ceramic material is used for the fibre roving.

3. The method according to claim 1, wherein the fibre roving comprises a material having a strength retention of at least 50% at 800 degrees Celsius.

4. The method according to claim 1, wherein the fibre roving comprises a material having a thermal conductivity of at most 0.25 W/(m·K) at 800 degrees Celsius.

5. The method according to claim 1, wherein the fibre roving comprises a material with an expansion coefficient below 8 μm/(m*L).

6. The method according to claim 1, wherein the resin material comprises a fire-retardant material.

7. The method according to claim 1, wherein the braid is applied directly to an outer casing of the battery cell.

8. The method according to claim 1, wherein the braiding is carried out such that the braid protrudes at at least one end relative to the battery cell.

9. The method according to claim 8, wherein the braid is formed at said at least one end with a reduced dimension compared to a remainder of the braid.

10. The method according to claim 8, wherein the braid is formed at said at least one end with an opening toward the exterior.

11. The method according to claim 1, further comprising curing the resin material by Ultra Violet, UV, radiation or at a temperature of at most 80 degrees Celsius.

12. The method according to claim 1, wherein the resin material comprises an exothermic reactive material cured at a temperature of at most 80 degrees Celsius and is cured by a catalyst material.

13. The method according to claim 1, wherein a plurality of battery cells are arranged continuously one behind the other as a battery cell string, and the method includes continuously feeding the battery cell string to a braiding device, and the braiding device continuously provides the battery cells with said braid as a continuous braid.

14. The method according to claim 13, further comprising placing a spacer material between adjacent ones of the battery cells in the string prior to feeding said battery cell string to the braiding device.

15. The method according to claim 13, further comprising feeding the battery cells to the braiding device through a tubular feed, with said feed being cut obliquely to a course thereof, whereby the battery cell string is already provided with the braiding on one side, while the battery cell string is still supported by the tubular feed on another side.

16. The method according to claim 13, wherein the battery cell string together with the braid is passed through a first bath with the resin material and then through a second bath with a catalyst material, an Ultra Violet, UV, irradiation device, or a temperature curing device to cure the resin material.

17. The method according to claim 13, further comprising cutting the battery cell string to length between the individual battery cells using a cutting device.

18. An encapsulated battery cell formed by the method according to claim 1.

* * * * *